US012630084B2

(12) United States Patent
Yoo

(10) Patent No.: US 12,630,084 B2
(45) Date of Patent: May 19, 2026

(54) METHOD OF WARNING INTERSECTION RIGHT TURN HAZARDS WITH AN INTERSECTION ENTRY GUIDANCE SYSTEM FOR A VEHICLE

(71) Applicants: HYUNDAI MOTOR COMPANY, Seoul (KR); KIA CORPORATION, Seoul (KR)

(72) Inventor: Jeong-Jae Yoo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 231 days.

(21) Appl. No.: 18/503,361

(22) Filed: Nov. 7, 2023

(65) Prior Publication Data

US 2024/0391384 A1 Nov. 28, 2024

(30) Foreign Application Priority Data

May 23, 2023 (KR) ........................ 10-2023-0066002

(51) Int. Cl.
*B60Q 9/00* (2006.01)
*B60Q 1/34* (2006.01)
*G08G 1/16* (2006.01)

(52) U.S. Cl.
CPC ............. *B60Q 9/008* (2013.01); *B60Q 1/346* (2013.01); *G08G 1/166* (2013.01)

(58) Field of Classification Search
CPC ........ B60Q 1/346; B60Q 9/008; G08G 1/166;

G08G 1/164; G08G 1/095; G06V 20/52; G06V 20/58; B60W 40/04; B60W 50/14; G01S 13/931; G08B 21/02; G08B 21/18
See application file for complete search history.

(56) References Cited

U.S. PATENT DOCUMENTS

2022/0340131 A1* 10/2022 Ito ........................ B60W 30/162

FOREIGN PATENT DOCUMENTS

KR 20020015135 A 2/2002
KR 20240000232 A * 1/2024 ............. G08G 1/075

* cited by examiner

*Primary Examiner* — Sisay Yacob
(74) *Attorney, Agent, or Firm* — Lempia Summerfield Katz LLC

(57) ABSTRACT

An intersection right turn hazard warning method using an intersection entry guidance system of a subject vehicle reduces a collision hazard that may occur upon a right turn of the subject vehicle at an intersection. The method may include determining intersection information and vehicle right turn information from a vehicle information sensor, traffic light-blinking pattern information of left/right crosswalk traffic lights and a road-traveling traffic light from a first vehicle exterior information sensor. The method may also include determining longitudinal movement pattern information of an object at the intersection from a second vehicle exterior information sensor. The method May further include outputting an intersection scenario-specific warning to a human machine interface (HMI) and/or a surround view monitor (SVM) upon a right turn of the subject vehicle at the intersection according to an intersection scenario selected from a intersection situation classification table.

19 Claims, 9 Drawing Sheets

FIG. 2

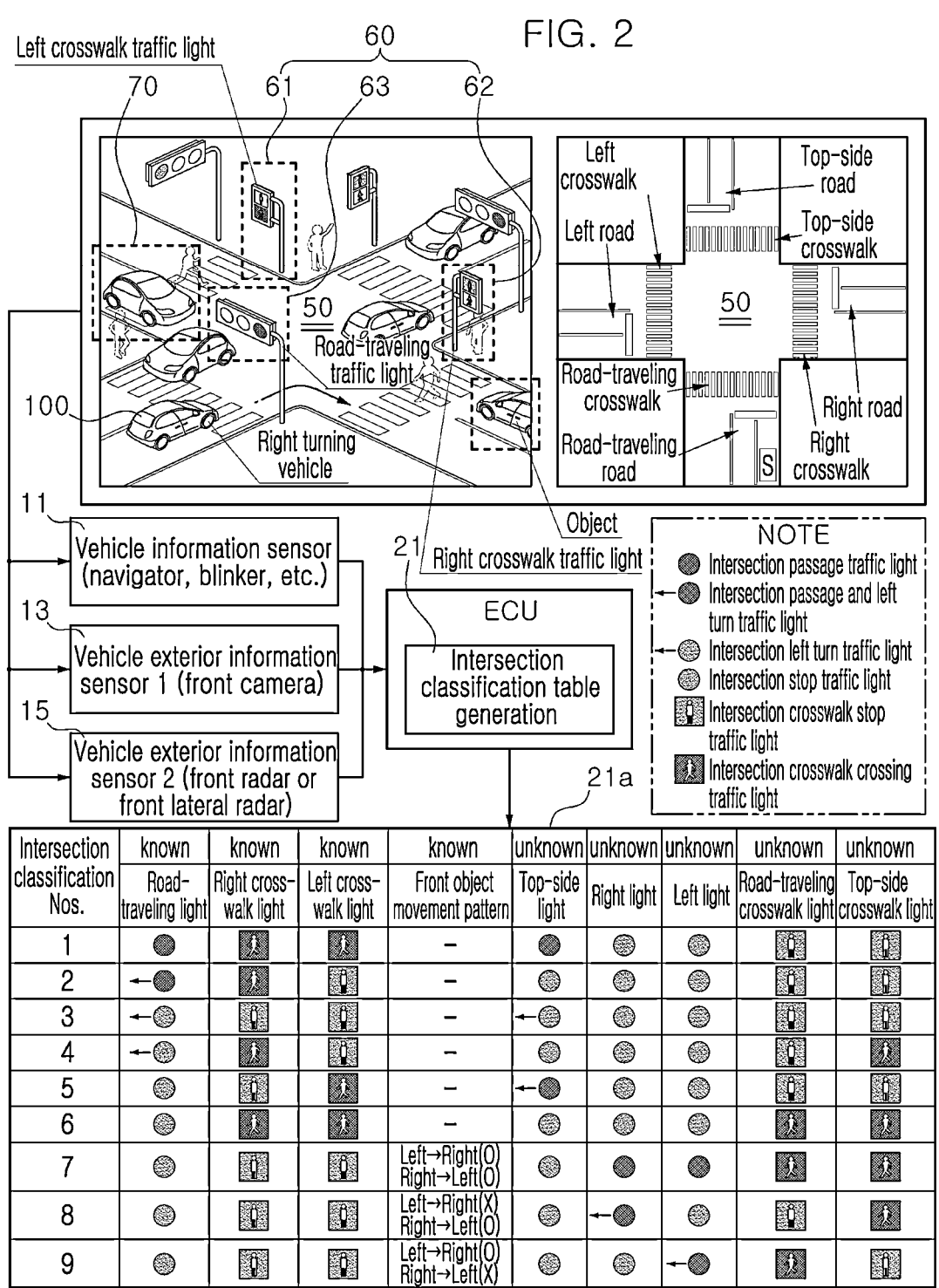

| Intersection classification Nos. | known Road-traveling light | known Right cross-walk light | known Left cross-walk light | known Front object movement pattern | unknown Top-side light | unknown Right light | unknown Left light | unknown Road-traveling crosswalk light | unknown Top-side crosswalk light |
|---|---|---|---|---|---|---|---|---|---|
| 1 | ● | 🚶 | 🚶 | – | ● | ◉ | ◉ | 🚶 | 🚶 |
| 2 | ←● | 🚶 | 🚶 | – | ◉ | ◉ | ◉ | 🚶 | 🚶 |
| 3 | ←◉ | 🚶 | 🚶 | – | ←◉ | ◉ | ◉ | 🚶 | 🚶 |
| 4 | ←◉ | 🚶 | 🚶 | – | ◉ | ◉ | ◉ | 🚶 | 🚶 |
| 5 | ◉ | 🚶 | 🚶 | – | ←● | ◉ | ◉ | 🚶 | 🚶 |
| 6 | ◉ | 🚶 | 🚶 | – | ◉ | ◉ | ◉ | 🚶 | 🚶 |
| 7 | ◉ | 🚶 | 🚶 | Left→Right(O) Right→Left(O) | ◉ | ● | ● | 🚶 | 🚶 |
| 8 | ◉ | 🚶 | 🚶 | Left→Right(X) Right→Left(O) | ◉ | ←● | ◉ | 🚶 | 🚶 |
| 9 | ◉ | 🚶 | 🚶 | Left→Right(O) Right→Left(X) | ◉ | ◉ | ←● | 🚶 | 🚶 |

FIG. 3

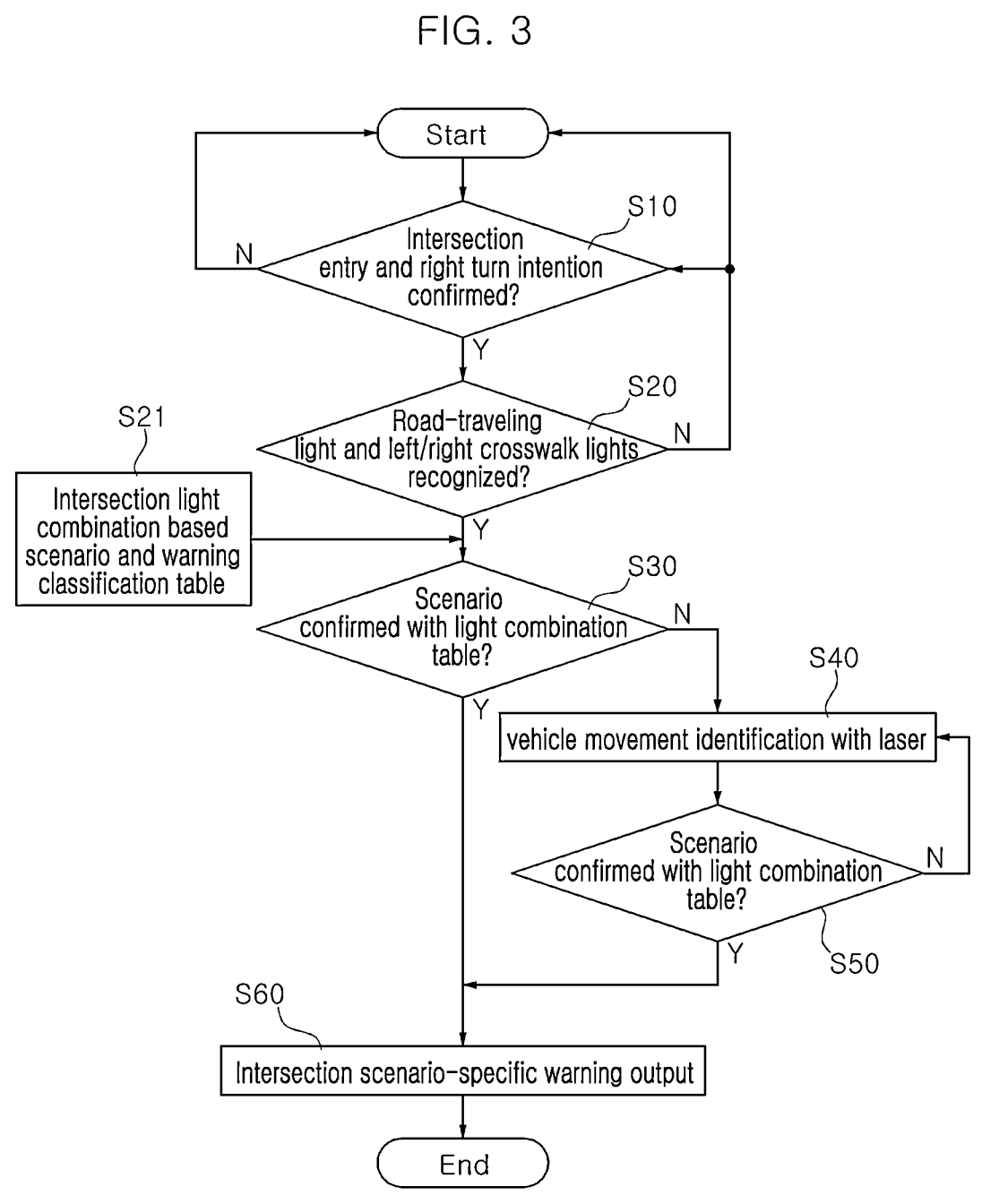

Start

S10
Intersection entry and right turn intention confirmed?
N
Y

S20
Road-traveling light and left/right crosswalk lights recognized?
N
Y

S21
Intersection light combination based scenario and warning classification table S30
Scenario confirmed with light combination table?
N
Y S40
vehicle movement identification with laser S50
Scenario confirmed with light combination table?
N
Y S60
Intersection scenario-specific warning output End <Front left turn vehicle collision warning>

<Crosswalk pedestrian collision warning + SVM On>

FIG. 9
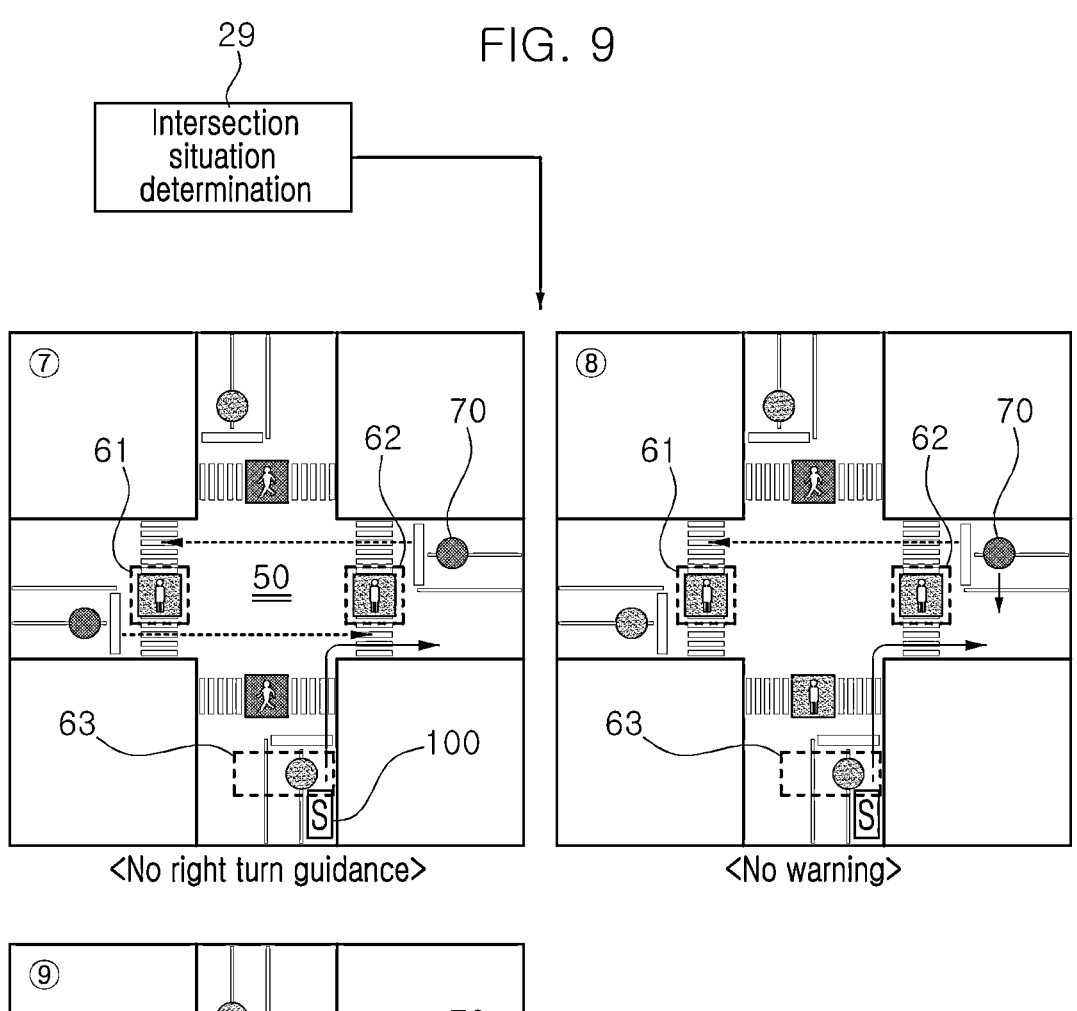
<No right turn guidance>                    <No warning>
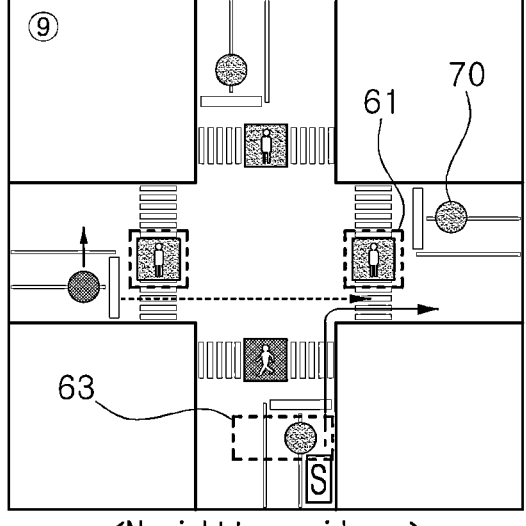
<No right turn guidance>

METHOD OF WARNING INTERSECTION RIGHT TURN HAZARDS WITH AN INTERSECTION ENTRY GUIDANCE SYSTEM FOR A VEHICLE

CROSS-REFERENCE TO RELATED APPLICATION

This application claims the benefit of and priority to Korean Patent Application No. 10-2023-0066002, filed on May 23, 2023, the entire contents of which are incorporated herein by reference.

TECHNICAL FIELD

The present disclosure relates generally to intersection entry by a vehicle, and more particularly, to a method of warning intersection right turn hazards with an intersection entry guidance system that reduces the hazard of collision that may occur during a right turn.

BACKGROUND

In general, at most road intersections, traffic lights are installed in each direction and vehicles pass according to the signals of the traffic lights. Accordingly, traffic accidents can be reduced by controlling the entry of a vehicle into an intersection according to the signals of the traffic lights.

When passing through an intersection, drivers typically go straight, turn left, or turn right according to the signals of the traffic lights in front of the vehicle. The drivers need to pay attention to the front vehicle and other vehicles approaching from the roads on the left and on the right with respect to direction of travel of the vehicle.

In situations of long-time driving, being tired in mind and body, or being in an urgent situation, drivers may not pay attention to the road ahead, which may lead to a collision at an intersection. In addition, when the intersection is under construction, the road conditions may be such that the visibility to the left and right is obstructed, which may lead to accidents caused by a driver. Further, when drivers are new to the intersection, drivers may cause accidents if the drivers are not paying special attention to vehicles entering the intersection from the left and right. Such accidents may result in loss of life and property.

In order to prevent intersection accidents caused by such carelessness, vehicles have recently been equipped with proximity sensors or charge coupled device (CCD) cameras to warn drivers that other vehicles are approaching the drivers' vehicles, or that the driver's vehicle is approaching other vehicles, to prevent collisions, such as rear-end collisions, with other vehicles.

However, such sensors or CCD cameras have the limitation that the sensors or CCD cameras can only detect and warn when other vehicles are approaching the subject vehicle. Due to this limitation, it is difficult to avoid an accident by vehicles approaching from the left and right sides even upon detection of the approaching vehicles at an intersection out of which the vehicles need to pass as quickly as possible.

The contents described in this section are to help the understanding of the background of the present disclosure, and may include what is not previously known to those having ordinary skill in the art to which the present disclosure pertains.

SUMMARY

Embodiments of the present disclosure provide an intersection right turn hazard warning method and a vehicle intersection entry guidance system that reduce the hazard of collision that may occur during a right turn at an intersection. In embodiments, the method and system use an intersection situation-specific right turn collision warning guidance that uses an intersection situation classification table based on a combination of camera and radar-based object movement patterns and road-traveling/crosswalk traffic lights.

In an embodiment, a method of providing a warning for a right turn hazard is provided. The method includes determining, by an intersection entry and right turn determination engine, an entry of a subject vehicle into a right turn at an intersection based on intersection information obtained from a vehicle information sensor and turning-on of a blinker of the subject vehicle. The method also includes, recognizing, by a traffic light recognition engine, a verifiable traffic light-blinking pattern for a left crosswalk traffic light, a right crosswalk traffic light, and a road-traveling traffic light from the intersection traffic light information by a first vehicle exterior information sensor. The method further includes identifying, by an intersection situation determination engine, a first scenario for each intersection entry from the verifiable traffic light-blinking pattern and an intersection situation classification table. The method additionally includes identifying, by a moving object identification engine, a second scenario for each intersection entry from the intersection situation classification table based on information about an object obtained by a second vehicle exterior information sensor as an object movement pattern at the intersection. The method further still includes, upon the entry of the subject vehicle into the right turn, outputting, by the intersection situation determination engine, an intersection scenario-specific warning according to the first scenario or the second scenario for each intersection entry to a human machine interface (HMI) of the subject vehicle.

In an aspect, an estimated traffic light-blinking state may be inferred based on the verifiable traffic light-blinking pattern for at least one of a crosswalk traffic light on the traveling road of the subject vehicle, a top-side traffic light and a top-side crosswalk traffic light on the top-side road of the subject vehicle, a left traffic light on the left road of the subject vehicle, and a right traffic light on the right road of the subject vehicle, which constitute verifiable and non-verifiable traffic lights among traffic lights at the intersection.

In an aspect, the verifiable traffic light-blinking pattern and the estimated traffic light-blinking state may include at least one of an intersection-passage traffic light, an intersection-passage/left turn traffic light, an intersection-left turn traffic light, an intersection-stop traffic light, an intersection crosswalk-stop traffic light, and an intersection crosswalk-crossing traffic light.

In an aspect, the first scenario for each intersection entry may include at least one of an intersection scenario 1 with "crossing-on" of the right crosswalk traffic light at "passage-on" of the road-traveling traffic light, an intersection scenario 2 with "crossing-on" of the right crosswalk traffic light at "passage and left turn on" of the road-traveling traffic light, an intersection scenario 3 with "stop-on" of the right crosswalk traffic light at "left turn on" of the road-traveling traffic light, an intersection scenario 4 with "crossing-on" of the right crosswalk traffic light at "left turn on" of the road-traveling traffic light, an intersection scenario 5 with "passage and left turn on" of the top-side road traffic light and "stop-on" of the right crosswalk traffic light at "stop-on" of the road-traveling traffic light, and an intersection scenario 6 with the "crossing-on" of a road-traveling crosswalk traffic light and "crossing-on" of the right crosswalk traffic light at the "stop-on" of the road-traveling traffic light.

In an aspect, the intersection situation determination engine may output "crosswalk pedestrian collision warning" as the intersection scenario-specific warning for each of the intersection scenarios 1, 2, 4, 6, no intersection scenario-specific warning for the intersection scenario 3. The intersection situation determination engine may output "front left turn vehicle collision warning" as the intersection scenario-specific warning for the intersection scenario 5.

In an aspect, each of the intersection scenarios 1, 2, 4, 6 may show the intersection scenario-specific warning through a bird's eye view of a surround view monitor (SVM) of the subject vehicle.

In an aspect, the second scenario for each intersection entry may include at least one of an intersection scenario 7 with "passage-on" of the left traffic light and "passage-on" of the right traffic light at "stop-on" of the road-traveling traffic light, an intersection scenario 8 with "passage and left turn on" of the right traffic light at "stop-on" of the road-traveling traffic light, and an intersection scenario 9 with "passage and left turn on" of the left traffic light at "stop-on" of the road-traveling traffic light.

In an aspect, the intersection situation determination engine may output "no-right turn guidance" as the intersection scenario-specific warning for each of intersection scenarios 7 and 8. No intersection scenario-specific warning may be output as the intersection scenario-specific warning for the intersection scenario 8.

In an aspect, the vehicle information sensor may be a navigator, the first vehicle exterior information sensor may be a front camera, and the second vehicle exterior information sensor may be a front radar or a front lateral radar.

In an aspect, the intersection information may include a distance D1 from the subject vehicle to a center line of a left-side forward lane of left road lanes from the subject vehicle at the intersection, and a distance D2 from the subject vehicle to a center line of a right-side forward lane of right road lanes from the subject vehicle at the intersection. A right turn lane where the subject vehicle is able to enter during a right turn may be confirmed by a difference between the distances D1 and D2.

In an aspect, the object movement pattern may be an object longitudinal movement on a left-side road of the subject vehicle or the object longitudinal movement on a right-side road of the subject vehicle, wherein the object longitudinal movement is subject to an object longitudinal movement range, wherein the object longitudinal movement range includes a minimum object longitudinal movement range, which is a sum of the distance D1 and a width $\alpha 1''$ of the left-side road of the subject vehicle, and a maximum object longitudinal movement range, which is a sum of the distance D2 and a width $\alpha 2''$ of the right-side road of the subject vehicle.

In another embodiment, a method of providing a warning for a right turn hazard is provided. The method includes determining, by an intersection entry and right turn determination engine, an entry of a subject vehicle into a right turn at an intersection based on intersection information obtained from a vehicle information sensor and turning-on of a blinker of the subject vehicle. The method also includes recognizing, in a traffic light recognition engine, a verifiable traffic light-blinking pattern for a left crosswalk traffic light, a right crosswalk traffic light, and a road-traveling traffic light from the intersection traffic light information by a first vehicle exterior information sensor. The method additionally includes identifying, by an intersection situation determination engine, a first scenario for each intersection entry from the verifiable traffic light-blinking pattern and an intersection situation classification table. The method further includes identifying, by a moving object identification engine, a third scenario for each intersection entry by adding information about an object obtained by a second vehicle exterior information sensor to the first scenario for each intersection entry. The method further still includes, upon the entry of the subject vehicle into the right turn, outputting, by the intersection situation determination engine, an intersection scenario-specific warning according to the third scenario for each intersection entry to a human machine interface (HMI) of the subject vehicle.

In yet another embodiment, a vehicle intersection entry guidance system is provided. The vehicle intersection entry guidance system includes a vehicle sensor configured to detect at least one of intersection information, right turn information, a traffic light-blinking pattern determined from at least one of a left crosswalk traffic light, a right crosswalk traffic light, and a road-traveling traffic light at an intersection, and an object longitudinal movement pattern of an object passing through the intersection. The vehicle intersection entry guidance system also includes an intersection controller configured to, upon a right turn of a subject vehicle at the intersection, generate a first scenario for each intersection entry according to the traffic light-blinking pattern and a second scenario for each intersection entry according to a combination of the traffic light-blinking pattern and the object longitudinal movement pattern. The intersection controller is further configured to output an intersection scenario-specific warning depending on the first and second scenarios. The vehicle intersection entry guidance system further includes a human machine interface (HMI) configured to generate the intersection scenario-specific warning. The vehicle intersection entry guidance system further still includes a surround view monitor (SVM) configured to provide the intersection scenario-specific warning through a bird's eye view.

In an aspect, the vehicle sensor may include a navigator for the intersection information, a blinker for the right turn information, a front camera for the traffic light-blinking pattern, and a front radar or a front lateral radar for the object longitudinal movement pattern.

In an aspect, the intersection controller may include an intersection situation classification table generation engine configured to classify the first and second scenarios into scenarios 1 to 9 by the combination of the traffic light-blinking pattern and the object longitudinal movement pattern to build an intersection situation classification table. The intersection controller may also include an intersection entry and right turn determination engine configured to check the intersection information and the right turn information and calculate a distance D1 to a center line of a left-side forward lane of left road lanes from the subject vehicle at the intersection and a distance D2 to a center line of a right-side forward lane of right road lanes from the subject vehicle at the intersection. The intersection controller may further include a traffic light recognition engine configured to estimate a traffic light-blinking status for the remaining traffic lights at the intersection depending on the traffic light-blinking pattern. The intersection controller may additionally include a moving object identification engine configured to identify the object longitudinal movement pattern as being a minimum object longitudinal movement range, which is a sum of the distance D1 and a width $\alpha 1''$ of the left-side road of the subject vehicle, and a maximum object longitudinal movement range, which is a sum of the distance D2 and a width α2″ of the right-side road of the subject vehicle. The intersection controller may further include an intersection situation determination engine configured to classify the first scenario into the scenarios 1 to 6 and the second scenario into the scenarios 7 to 9 with reference to the intersection situation classification table and output the intersection scenario-specific warning.

In various embodiment, the intersection right turn hazard warning method using the vehicle intersection entry guidance system of the present disclosure provides the following operations and effects.

Embodiments of the present disclosure can respond to the recently strengthened right turn regulations by providing safe right turn guidance to a vehicle driver at an intersection with anticipation of different collisions that may occur in different intersection situations upon a vehicle's right turn at an intersection.

Embodiments of the present disclosure utilize the existing front camera traffic light image recognition technology and front radar object identification technology of mass-produced vehicles, so it is possible to implement logic without installing additional sensors.

Embodiments of the present disclosure can minimize the system load on the amount of computation for the logic implementation function by determining the intersection situations using the intersection situation classification table created in advance.

Embodiments of the present disclosure can greatly expand the usability of the function by utilizing a surround view monitor (SVM), one of the parking assistance systems that displays the situation around the vehicle as image.

Embodiments of the present disclosure can build the intersection situation classification table for various intersections such as 3-way, 5-way, and roundabouts with a small change, which can expand the field of application of the function.

BRIEF DESCRIPTION OF THE DRAWINGS

The above and other aspects, features, and advantages of the present disclosure should be more clearly understood from the following detailed description taken in conjunction with the accompanying drawings, in which:

FIG. 2 is an example of construction of an intersection situation classification table by an intersection classification table generation engine of the intersection entry guidance system, according to an embodiment of the present disclosure;

FIG. 3 is a flowchart illustrating a vehicle intersection right turn hazard warning method using a vehicle intersection entry guidance system, according to an embodiment of the present disclosure;

FIG. 9 is an example of further intersection scenarios for a vehicle entering a right turn at an intersection, according to an embodiment of the present disclosure.

DETAILED DESCRIPTION

Embodiments of the present disclosure are described below in detail with reference to the accompanying illustrative drawings. The embodiments are illustrative and not limited to the embodiments described herein. One having ordinary skill in the art to which the present disclosure pertains may implement the embodiments into many different forms.

Terms such as "~unit", "~part," "~block," "~member," "~module," "~engine" and the like may denote a unit for performing at least one function or operation. For example, the terms may refer to at least one hardware component such as a field-programmable gate array (FPGA) or an application specific integrated circuit (ASIC), at least one software stored in a memory, or at least one process performed by a processor.

When a component, device, element, or the like of the present disclosure is described as having a purpose or performing an operation, function, or the like, the component, device, or element should be considered herein as being "configured to" meet that purpose or perform that operation or function.

Figure 1:
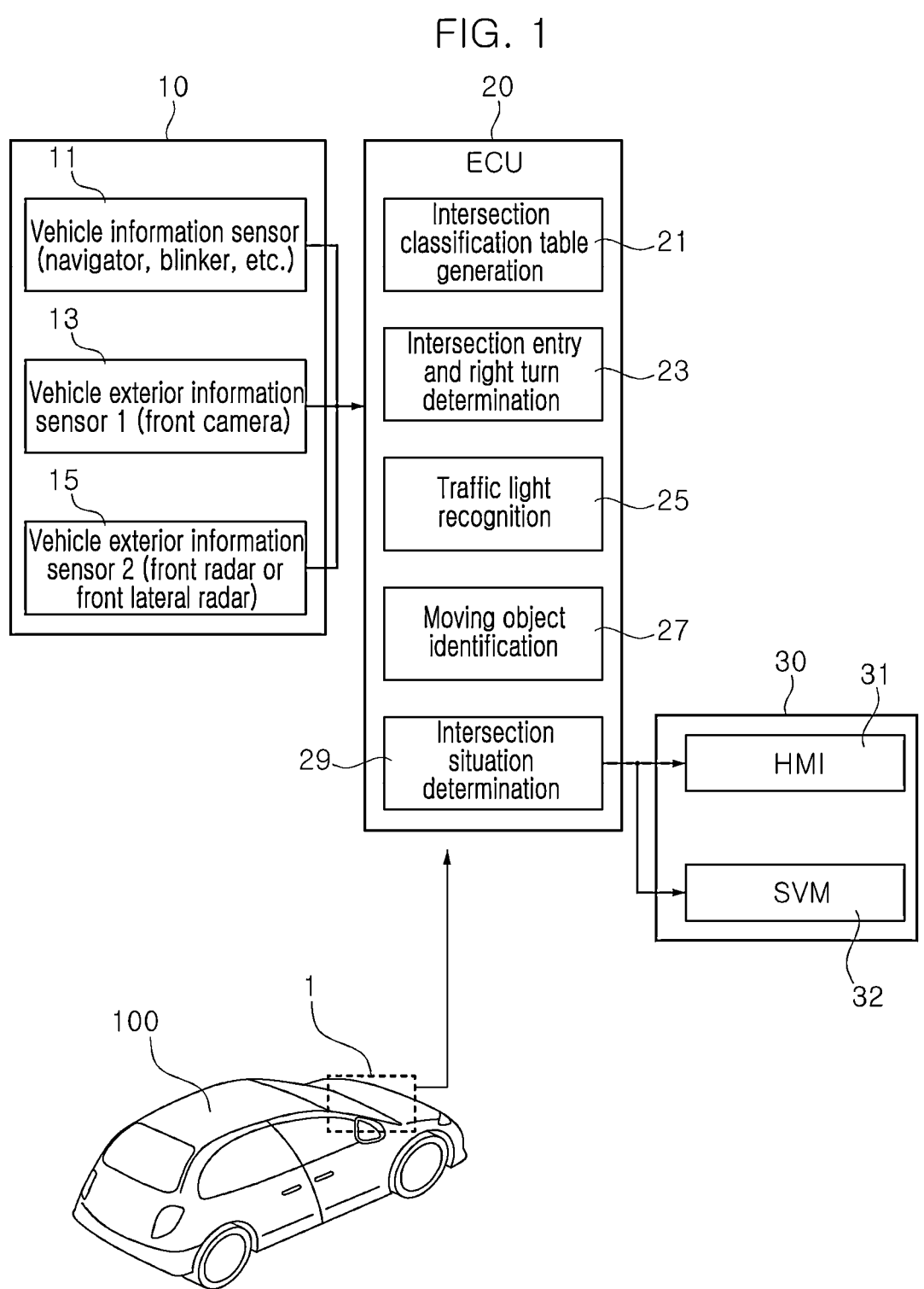
FIG. 1 is a block diagram illustrating a vehicle intersection entry guidance system, according to an embodiment of the present disclosure.

Referring to FIG. 1, according to an embodiment, an intersection entry guidance system 1 for a vehicle 100 includes a vehicle sensor 10, an intersection controller 20, and an intersection information unit 30.

The vehicle sensor 10 includes a vehicle information sensor 11, a first vehicle exterior information sensor 13, and a second vehicle exterior information sensor 15.

In an example, the vehicle information sensor 11 includes a navigator for recognizing road information, the location and speed of a subject vehicle along with map data. The vehicle information sensor 11 may also include blinkers for recognizing the subject vehicle's intention to turn right. The vehicle information sensor 11 may output pieces of information that can be used to determine the intersection entry and right turn intention of the subject vehicle to the intersection controller 20.

In an example, the first vehicle exterior information sensor 13 is a front camera that picks-up an image of the front area of the subject vehicle to identify the intersection surrounding information. In an example, the second vehicle exterior information sensor 15 is a front radar that identifies movement pattern information of a moving object in the intersection surrounding information in the front area of the subject vehicle. In another example, the second vehicle exterior information sensor 15 is a front lateral radar that identifies movement pattern information of a moving object in the intersection surrounding information in the front and lateral areas of the subject vehicle. The movement pattern information of the object may include other vehicles located at the intersection and pedestrians located at the crosswalks.

In an embodiment, the first and second vehicle exterior information sensors 13 and 15 output, to the intersection controller 20, object 70 (see FIG. 2) traffic light formation and moving object information, along with intersection surroundings information required for determining the situation of the intersection 50, including left/right crosswalk traffic lights 61,62 and a road-traveling traffic light 63 that are recognized. The object 70 may be a neighboring vehicle stopped at or passing through the intersection 50 and/or a person stopped at or crossing the crosswalk.

In an embodiment, the intersection controller 20 is responsible for performing operations to determine the intersection situation and situation-specific collision hazard based on information input from the vehicle sensor 10. The intersection controller 20 may be an electronic control unit (ECU), for example. The intersection controller 20 may include an intersection classification table generation engine 21, an intersection situation classification table 21a, an intersection entry and right turn determination engine 23, a traffic light recognition engine 25, a moving object identification engine 27, and an intersection situation determination engine 29, outputs of which may be provided to the intersection information unit 30 so that a warning is generated. The intersection classification table generation engine 21, intersection entry and right turn determination engine 23, the traffic light recognition engine 25, and/or the intersection situation determination engine 29 may comprise at least one hardware component such as a field-programmable gate array (FPGA) or an application specific integrated circuit (ASIC), at least one software stored in a memory, or at least one process performed by a processor.

In an example, the intersection classification table generation engine 21 checks a combination of i) the left/right crosswalk traffic lights 61 and 62 and the road-traveling traffic light 63 recognizable by the front camera of the first vehicle exterior information sensor 13 and ii) the movement pattern of the object 70, and estimates the remaining traffic lights of the intersection with the checked information to generate an intersection situation classification table 21a (see FIG. 2) in which the intersection scenarios are classified into nine types of scenarios.

In an example, the intersection entry and right turn determination engine 23 obtains, from the navigation information of the vehicle information sensor 11, information about whether a subject vehicle enters the intersection and the position relationship between the intersection and the subject vehicle, and determines the intention to turn right with turning-on of a blinker.

In an example, the traffic light recognition engine 25 matches the intersection situation to the scenarios 1 to 6 in the intersection situation classification table 21a (see FIG. 2) using three traffic lights including the left/right crosswalk traffic lights 61 and 62 and the road-traveling traffic light 63 recognizable by the front camera.

In an example, when the intersection situation cannot be determined based on the combination of recognizable traffic lights by the traffic light recognition section 25 alone, the moving object identification engine 27 obtains information to determine the intersection situation by matching the intersection situation to the scenarios 7 to 9 in the intersection situation classification table 21a (see FIG. 2), and using the object movement pattern identified by the second vehicle exterior information sensor 15.

In an example, the intersection situation determination engine 29 determines the current intersection situation from the intersection situation classification table 21a (see FIG. 2) by using the traffic light information obtained by the traffic light recognition engine 25 and the object movement pattern information obtained by the moving object identification engine 27 to determine a right turn warning for each intersection situation. The intersection situation determination engine 29 may thus provide a right turn warning tailored for each situation to a driver.

For example, the intersection information unit 30 may be configured with a human machine interface (HMI) 31 and/or a surround view monitor (SVM) 33 for warning about right turns tailored for each situation.

In an embodiment, the SVM 33 is a system that can visually check the surroundings of the subject vehicle in a bird's-eye view using front, rear, left and right cameras to enhance the prevention of pedestrian collision at crosswalks.

Referring to FIG. 2, the intersection situation classification table 21a built and utilized by the intersection classification table generation engine 21, according to an embodiment, is illustrated.

As illustrated, the intersection classification table generation engine 21 may generate the intersection situation classification table 21a applied at the intersection 50 by utilizing the intersection entry information from the navigator of the vehicle information sensor 11, the right turn entry information from the blinker, the intersection image information from the front camera of the first vehicle exterior information sensor 13, and the object 70 movement pattern information from the front radar or the front lateral radar of the second vehicle exterior information sensor 15 as input data. The intersection classification table generation engine 21 may utilize, among these input data, the left/right crosswalk traffic lights 61, 62, the road-traveling traffic light 63, and the object 70 as the intersection situation variables. In the illustrated example, the object 70 includes two-wheeled vehicles and personal mobility, etc., along with other vehicles passing through the intersection 50.

In an embodiment, generation and construction of the intersection situation classification table 21a is performed by utilizing intersection information obtained from a list of combinations of left/right crosswalk traffic lights 61 and 62 and road-traveling traffic light 63, which are recognizable by the front camera, and estimating remaining intersection information obtained from a list of the object 70 movement patterns at the intersection, which are not recognizable by the front camera at the intersection 50, so that the intersection scenarios are classified into nine types of scenarios.

In an example, the intersection situation classification consists of an intersection traffic light classification status and an intersection traffic light operation status for each traffic light combination (e.g., a combination based on left/right crosswalk traffic lights 61,62/road-traveling traffic light 63) at the intersection 50 with reference to the road and crosswalk where a vehicle 100 (i.e., subject vehicle) is located at the intersection 50.

In an example, the intersection traffic light classification status includes 8 categories of traffic lights: "road-traveling traffic light" and "crosswalk traffic light on the road-traveling" for the position where a subject vehicle is stopped, "top-side traffic light" and "top-side crosswalk traffic light" for the position in front of the subject vehicle, "left traffic light" and "left crosswalk traffic light" on the left-side road from the subject vehicle, and "right traffic light" and "right crosswalk traffic light" on the right-side road from the subject vehicle.

In an embodiment, the "road-traveling traffic light", "left crosswalk traffic light", and "right crosswalk traffic light" are recognized by the road-traveling traffic light 63, the left crosswalk traffic light 61, and the right crosswalk traffic light 62, respectively. On the other hand, "crosswalk traffic light on the road-traveling", "top-side traffic light", "top-side crosswalk traffic light", "left traffic light", and "right traffic light" are each estimated from the combinations of "road-traveling traffic light"/"left crosswalk traffic light"/"right crosswalk traffic light" because they cannot be recognizable by the front camera.

In an example, a front object movement pattern (i.e., movement pattern of the object 70) is classified into two types: a bi-directional movement pattern of "Left→Right (○)", which is the movement of the object from the left road to the right road, and "Right→Left (○)", which is the movement of the object from the right road to the left road; and a unidirectional movement pattern of "Left→Right (X)", which is the stop of the object on the left road and the right road, and "Right→Left (○)", which is the movement of the object on the right road at the stop of the left road.

Therefore, the intersection traffic light operation status is classified into four categories: "intersection passage traffic light", "intersection passage and left turn traffic light", "intersection stop and left turn traffic lights", and "intersection stop traffic light", and the crosswalk traffic light operation status is classified into two categories: "intersection crosswalk stop traffic light" and "intersection crosswalk crossing traffic light".

Based on this classification, intersection scenarios 1 to 9 according to the intersection situation classification table 21a, according to an embodiment, are as follows.

The intersection scenario 1 is characterized by "passage-on of road-traveling/top-side traffic lights", "stop-on of left/right traffic lights", "crossing-on of left/right crosswalk traffic lights", and "stop-on of road-traveling crosswalk/top-side traffic lights".

The intersection scenario 2 is characterized by "road-traveling traffic light passage and left turn on", "stop-on of top-side/left/right traffic lights", "crossing-on of right crosswalk traffic light", and "stop-on of left crosswalk/road-traveling/top-side traffic lights".

The intersection scenario 3 is characterized by "left turn on of road-traveling/top-side traffic lights", "stop-on of left/right traffic lights", and "stop-on of road-traveling crosswalk/left/right/top-side traffic lights".

The intersection scenario 4 is characterized by "road-traveling left turn on", "stop-on of top-side/left/right traffic lights", "crossing-on of right/top-side crosswalk traffic lights", and "stop-on of left crosswalk/road-traveling traffic lights".

The intersection scenario 5 is characterized by "stop-on of road-traveling/right/left traffic lights", "passage-on of top-side traffic light", "crossing-on of left crosswalk traffic light", and "stop-on of road-traveling/top-side/right crosswalk traffic lights".

The intersection scenario 6 is characterized by "stop-on of road-traveling/top-side/left/right traffic lights" and "crossing-on of road-traveling/left/right/top-side crosswalk traffic lights".

The intersection scenario 7 is characterized by "stop-on of road-traveling/top-side traffic lights", "passage-on of left/right traffic lights", "crossing-on of road-traveling/top-side crosswalk traffic lights", "stop-on of left/right crosswalk traffic lights", and bi-directional object movement of "Left→Right (○)/Right→Left (○)".

The intersection scenario 8 is characterized by "stop-on of road-traveling/top-side/left traffic lights", "passage-on of right traffic light", "stop-on of road-traveling/left/right crosswalk traffic lights", "crossing-on of top-side crosswalk traffic light", and unidirectional object movement of "Left→Right (X)/Right→Left (○)".

Accordingly, the intersection scenarios 1 to 6 each are characterized in that one kind of recognizable traffic light combination reflects one intersection situation, and the intersection scenarios 7 to 9 are characterized in that the intersection situations are distinguished by the movement patterns of the object 70, because the scenarios have the same traffic light combination.

Referring to FIG. 3, an intersection right turn hazard warning method that may be implemented in the vehicle 100, according to an embodiment, includes a step or operation S10 of confirming the intersection entry and right turn intention, a step or operation S20 of recognizing a verifiable traffic light, steps or operations S30-S50 of determining intersection scenarios, and a step or operation S60 of outputting an intersection scenario-specific warning.

Hereinafter, the vehicle 100 refers to a subject vehicle.

In an example, the intersection entry and right turn intention confirmation step or operation S10 obtains the intersection position relationship of the subject vehicle 100. For example, the intersection entry and right turn determination engine 23 of the intersection controller 20 confirms the intersection entry and right turn intention from the navigation information.

Figure 4:
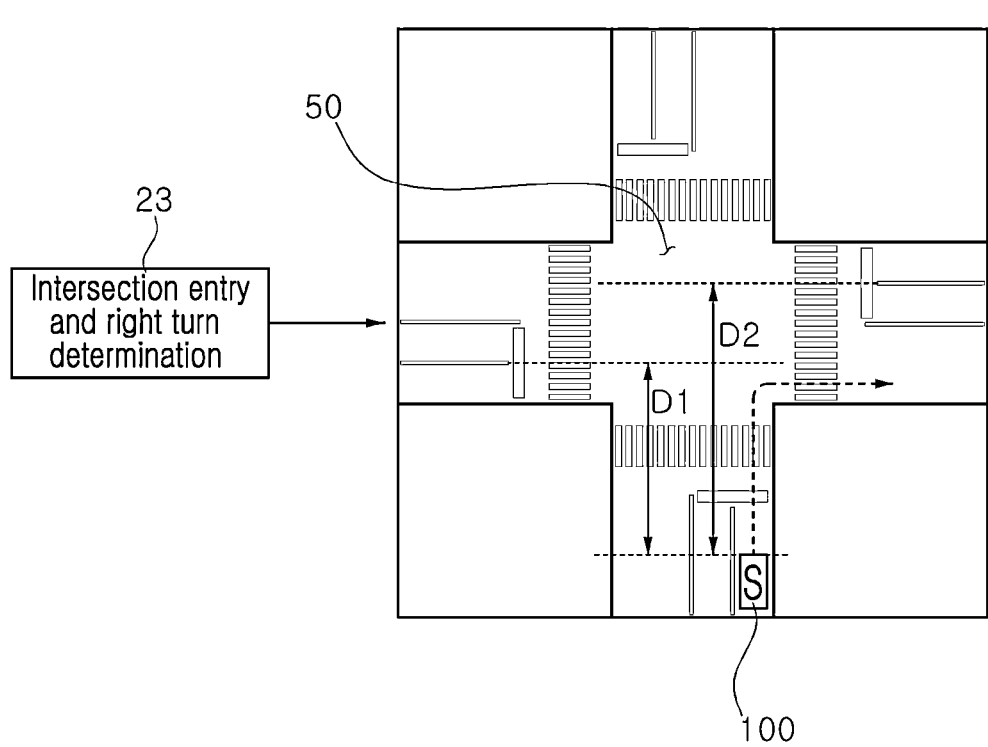
FIG. 4 is an example of confirming the intersection entry and right turn intention by an intersection entry and right turn determination engine, according to an embodiment of the present disclosure.

Referring to FIG. 4, the intersection entry and right turn determination engine 23, according to an embodiment, obtains information about whether the subject vehicle 100 enters the intersection 50 and about the position relationship between the intersection 50 and the subject vehicle 100, from the navigation information of the vehicle information sensor 11. The intersection entry and right turn determination engine 23 confirms the intention to turn right at the intersection 50 from a blinker of the subject vehicle 100.

In an embodiment, the intersection entry and right turn determination engine 23 uses information about the subject vehicle 100 and the intersection lanes to determine whether the subject vehicle 100 enters the intersection 50 from the position relationship of the subject vehicle 100.

In an example, a "left road" on the left side of the subject vehicle and a "right road" on the right side of the subject vehicle 100 are used. In an example, as obtained from the navigation information, a distance from the subject vehicle to a center line of the left-side forward lane of left road lanes from the subject vehicle 100 is defined as D1. Further, a distance from the subject vehicle to a center line of a right-side forward lane of right road lanes from the subject vehicle 100 is defined as D2. The distances D1 and D2 and the number of lanes are variables for determining the position relationship between the subject vehicle 100 and the intersection 50.

When the intention to turn right is confirmed by a blinker, a right turn lane where the subject vehicle 100 is able to enter from the right-side forward lane may be confirmed by the difference between the distances D1 and D2.

In an example, the verifiable traffic light recognition step or operation S20 determines the intersection situation using the three traffic lights of road-traveling and left/right crosswalk traffic lights. For example, the traffic light recognition engine 25 of the intersection controller 20 checks the front camera information of the first vehicle exterior information sensor 13 to determine the intersection situation using the three traffic lights of road-traveling and left/right crosswalk traffic lights.

Figure 5:
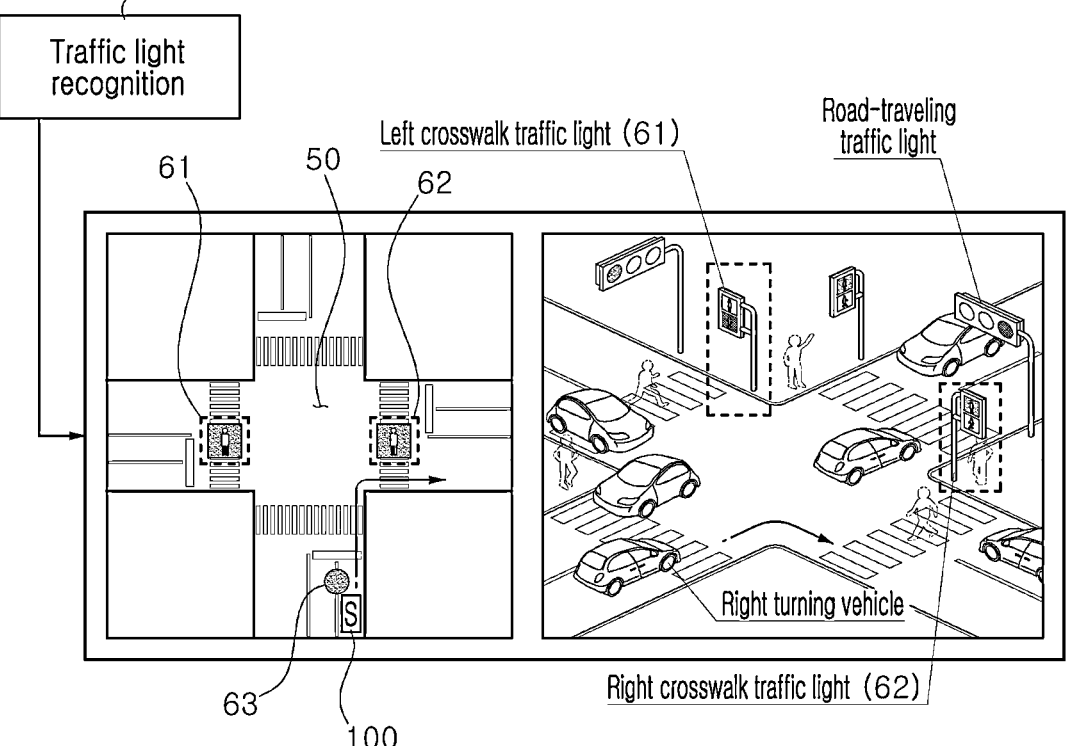
FIG. 5 is an example of recognizing a road-traveling traffic light and left/right crosswalk traffic lights by a traffic light recognition engine, according to an embodiment of the present disclosure.

Referring to FIG. 5, the traffic light recognition engine 25, according to an embodiment, determines the right turn possibility of the subject vehicle 100 at the intersection 50 by recognizing the "stop-on of road-traveling traffic light 63" and the "stop-on of left/right crosswalk traffic lights 61 and 62" with the front camera.

Therefore, the right turn possibility corresponds to intersection scenarios 1 to 6, which are categorized as the first scenario in the intersection situation classification table 21*a*. In this example, intersection scenarios 7 to 9 are categorized as the second scenarios.

The intersection scenario determination steps or operations S30-S50 are performed as the intersection right turn determination steps S30 and S60 when a stationary object is recognized, or are performed as the intersection right turn determination steps S30, S40, S50, and S60 when a moving object is recognized.

The intersection right turn determination steps or operations S30 and S60 when a stationary object is recognized includes a first scenario confirmed (Y) step for each intersection entry S30 and an intersection scenario-specific warning output step S60. In this situation, the first scenario corresponds to intersection scenarios 1 to 6.

In an example, the first scenario confirmed (Y) step for each intersection entry S30 is performed by reading the intersection situation classification table 21*a*. For example, the intersection situation determination engine 29 of the intersection controller 20 reads the intersection situation classification table 21*a* as in the step or operation S21.

As a result, the intersection situation determination engine 29 selects one of the intersection scenarios 1 to 6 among the intersection scenarios 1 to 9 in the intersection situation classification table 21*a* based on the verifiable traffic light recognition in the step or operation S20.

In an example, the intersection scenario-specific warning output step or operation S60 is performed via the HMI 31 and/or the SVM 33 of the intersection entry guidance system 1, and a warning is made to caution the driver of the subject vehicle 100 that is about to turn right at the intersection 50, according to respective intersection scenarios 1-6.

In this way, the driver can safely perform the right turn of the subject vehicle 100 at the intersection 50 with the aid of the HMI 31 and/or the SVM 33, which can visually check the vehicle's surroundings through a bird's eye view.

Figure 6:
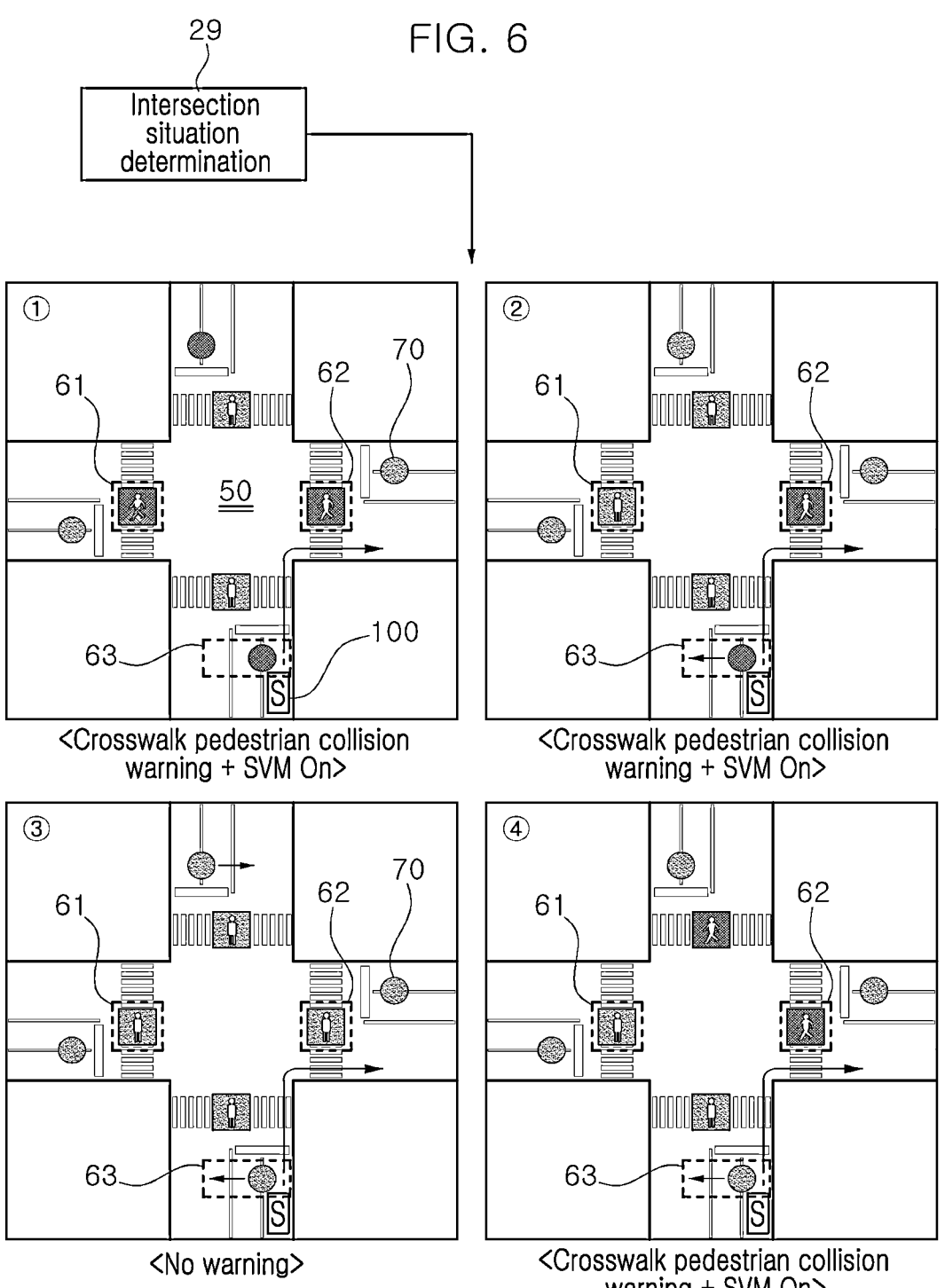
FIGS. 6 and 7 are examples of intersection scenarios for a vehicle entering a right turn at an intersection, according to an embodiment of the present disclosure.
Figure 7:
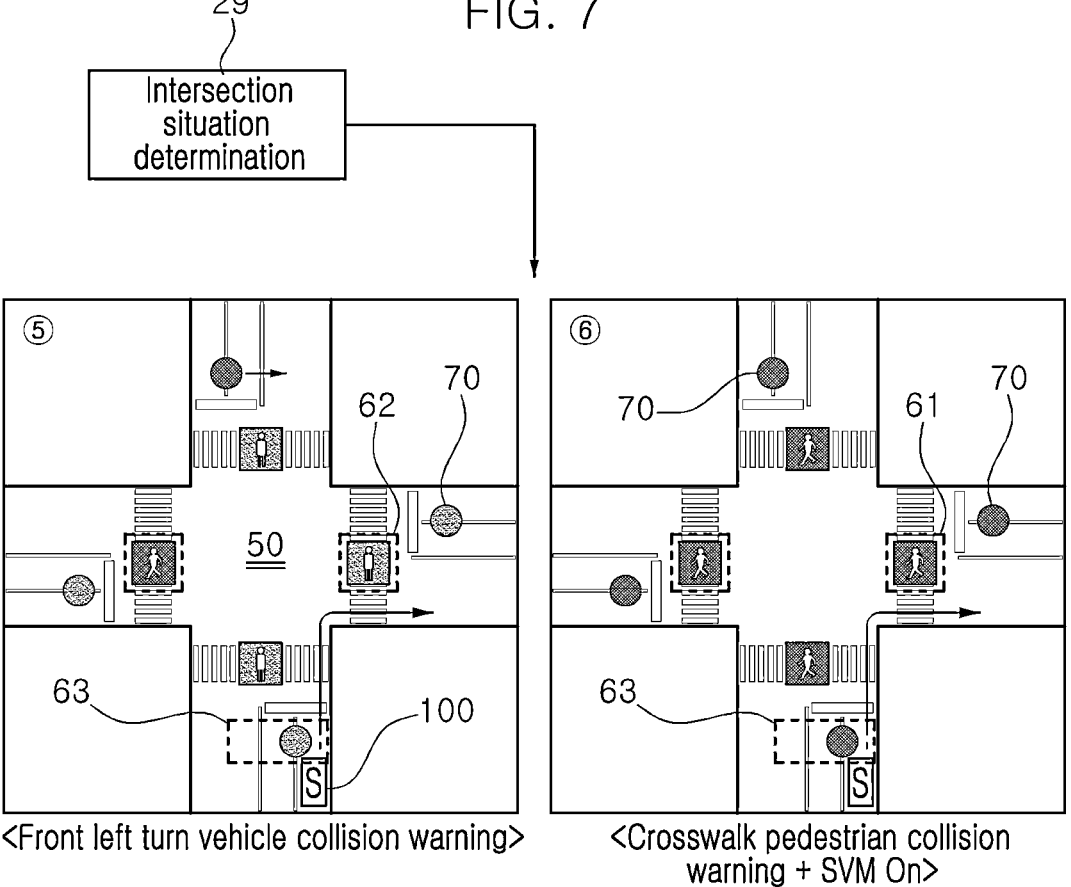

FIGS. 6 and 7 illustrate an example of a subject vehicle 100 making a right turn at an intersection 50 using any one of intersection scenarios 1-6, according to an embodiment.

Referring to FIG. 6, intersection scenarios 1 to 4, according to an embodiment, are exemplified based on three identifiable traffic lights: a left crosswalk traffic light 61, a right crosswalk traffic light 62, and a road-traveling traffic light 63.

In the intersection scenario 1, "crossing-on of left crosswalk traffic light 61", "crossing-on of right crosswalk traffic light 62", and "passage-on of road-traveling traffic light 63" are recognized. Road-traveling crosswalk traffic light of the subject vehicle 100 is thus estimated as being in "stop-on of road-traveling crosswalk traffic light".

Accordingly, it is recognized that a pedestrian may be crossing the right crosswalk in the direction in which the subject vehicle 100 is about to turn right, the intersection situation determination engine 29 may thus output a "crosswalk pedestrian collision warning" to the HMI 31, and may activate the bird's eye view of the SVM 33 to check the intersection scenario-specific warning situation.

In the intersection scenario 2, "stop-on of left crosswalk traffic light 61", "crossing-on of right crosswalk traffic light 62", and "road-traveling traffic light 63 passage and left turn on" are recognized. Road-traveling crosswalk traffic light of the subject vehicle 100 is thus estimated as being in "stop-on of road-traveling crosswalk traffic light".

Accordingly, it is recognized that a pedestrian may be crossing the right crosswalk in the direction in which the subject vehicle 100 is about to turn right. The intersection situation determination engine 29 may thus output a "crosswalk pedestrian collision warning" to the HMI 31, and may activate the bird's eye view of the SVM 33 to check the intersection scenario-specific warning situation.

In the intersection scenario 3, "stop-on of left crosswalk traffic light 61", "stop-on of right crosswalk traffic light 62", and "road-traveling traffic light 63 left turn on" are recognized. Road-traveling crosswalk traffic light of the subject vehicle 100 is thus estimated as being in "stop-on of road-traveling crosswalk traffic light".

Accordingly, the intersection situation determination engine 29 does not output a "crosswalk pedestrian collision warning" because a pedestrian may not be crossing the right crosswalk in the direction in which the subject vehicle 100 is about to turn right.

In the intersection scenario 4, "stop-on of left crosswalk traffic light 61", "crossing-on of right crosswalk traffic light 62", and "road-traveling traffic light 63 left turn on" are recognized. Road-traveling crosswalk traffic light of the subject vehicle 100 is thus estimated as being in "stop-on of road-traveling crosswalk traffic light".

Accordingly, it is recognized that a pedestrian may be crossing the right crosswalk in the direction in which the subject vehicle 100 is about to turn right. The intersection situation determination engine 29 may thus output a "crosswalk pedestrian collision warning" to the HMI 31, and may activate the bird's eye view of the SVM 33 to check the intersection scenario-specific warning situation.

Referring to FIG. 7, intersection scenarios 5 and 6, according to an embodiment, are exemplified based on three identifiable traffic lights: a left crosswalk traffic light 61, a right crosswalk traffic light 62, and a road-traveling traffic light 63.

In the intersection scenario 5, "crossing-on of left crosswalk traffic light 61", "stop-on of right crosswalk traffic light 62", and "stop-on of road-traveling traffic light 63" are recognized. Road-traveling crosswalk traffic light of the subject vehicle 100 is thus estimated as being in "stop-on of road-traveling crosswalk traffic light", Further, the top-side traffic light is estimated as being in "road-traveling traffic light passage/left turn on".

Accordingly, it is recognized that in the direction in which the subject vehicle 100 is about to turn right, a pedestrian may not be crossing the right crosswalk, while in the position on the road in front of the subject vehicle, an object (i.e., another vehicle) may be turning left toward a right-side road of the subject vehicle. The intersection situation determination engine 29 may thus output a "front-side left turn vehicle collision warning" to the HMI 31.

In the intersection scenario 6, "crossing-on of left crosswalk traffic light 61", "crossing-on of right crosswalk traffic light 62", and "stop-on of road-traveling traffic light 63" are recognized. Road-traveling crosswalk traffic light of the subject vehicle 100 is thus estimated as being in "crossing-on of road-traveling crosswalk traffic light". Further, the top-side traffic light is estimated as being in "stop-on of road-traveling traffic light".

Accordingly, it is recognized that pedestrians may be crossing both the crosswalk on the road where the subject vehicle 100 stops and the right crosswalk in the direction in which the subject vehicle 100 is about to turn right. I intersection situation determination engine 29 may thus output a "crosswalk pedestrian collision warning" to the HMI 31, and may activate the bird's eye view of the SVM 33 to check the intersection scenario-specific warning situation.

Referring again to FIG. 3, the intersection right turn determination steps upon the object movement steps or operations S30, S40, S50, and S60 include a first scenario not confirmed (N) step or operation for each intersection entry S30, an object movement pattern recognition step or operation S40, a second scenario confirmed (Y) step for each intersection entry step or operation S50, and an intersection scenario-specific warning output step or operation S60.

In an example, the first scenario not confirmed (Y) step for each intersection entry step or operation S30 is performed by reading the intersection situation classification table 21a. For example, the intersection situation determination engine 29 of the intersection controller 20 reads the intersection situation classification table 21a as in the step or operation S21.

As a result, the intersection situation determination engine 29 selects one of the intersection scenarios 7 to 9 among the intersection scenarios 1 to 9 in the intersection situation classification table 21a based on the identifiable movement pattern of the object 70.

In an example, the object movement pattern recognition step or operation S40 confirms currently traveling lane and direction of the object 70, For example, the moving object identification engine 27 of the intersection controller 20 confirms the traveling direction of another vehicle (i.e., the object 70) at the intersection 50 with the front radar information of the second vehicle exterior information sensor 15.

Figure 8:
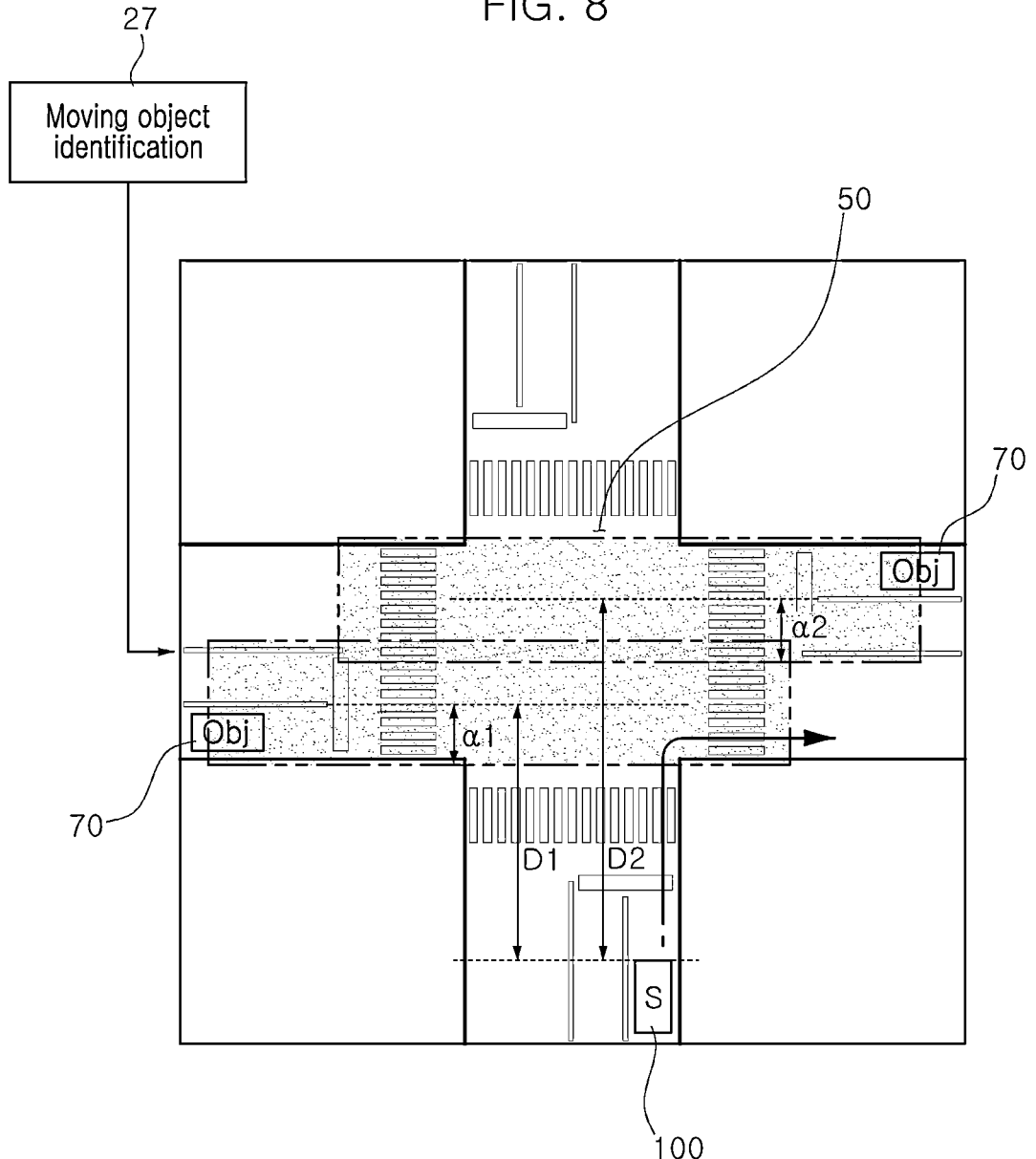
FIG. 8 is an example of identifying vehicle movement using radar by a moving object identification engine, according to an embodiment of the present disclosure.

Referring to FIG. 8, the moving object identification engine 27, according to an embodiment, determines the currently traveling lane and direction of the object from the front radar. The moving object identification engine 27 then sets a maximum/minimum longitudinal range for the object 70 using the distances D1 and D2 and the number of lanes, which are variables for confirming the position relationship between the subject vehicle 100 and the intersection 50 (which is confirmed by the navigation information of the vehicle information sensor 11 in the previous step or operation S10), while reflecting the error characteristics of the front radar. For example, the moving object identification engine 27 sets a maximum/minimum longitudinal range for the object 70 as follows:

Object Longitudinal Movement Max/Min Range
Relation–(1)

Minimum Range of Object Longitudinal
Movement=D1±α1

Maximum Range of Object Longitudinal
Movement=D2±α2 where "D1" is a distance from the subject vehicle to a center line of a left-side forward lane of a "left road", "D2" is a distance from the subject vehicle to a center line of a right-side forward lane of a "right road", "α1" is a width of one of lanes of the "left road", and "α2" is a width of one of lanes of the "right road".

Accordingly, the minimum range of the object longitudinal movement (D1±α1) may include the range to all the lanes of the "left road" from the subject vehicle 10, and the maximum range of the object longitudinal movement (D2±α2) may include the range to all the lanes of the "right road" from the subject vehicle 10.

In this way, the object movement pattern recognition step or operation S40 may determine currently traveling lane and direction of the object 70 by using the object 70 information obtained from the front radar.

In an example, the second scenario confirmed (Y) step for each intersection entry in the step or operation S50 is performed by reading the intersection situation classification table 21a. For example, the intersection situation determination engine 29 of the intersection controller 20 reads the intersection situation classification table 21a as in S21.

As a result, the intersection situation determination engine 29 selects any one of the intersection scenarios 7 to 9 among the intersection scenarios 1 to 9 in the intersection situation classification table 21a based on the identifiable object 70 movement pattern.

In an example, the intersection scenario-specific warning output step or operation S60 is performed via the HMI 31 and/or the SVM 33 of the intersection entry guidance system 1, and a warning is made to caution the driver of the subject vehicle 100 which is about to turn right at the intersection 50, according to respective intersection scenarios 1-6.

In this way, the driver can safely perform the right turn of the subject vehicle 100 at the intersection with the aid of the HMI 31 and/or the SVM 33, which can visually check the vehicle's surroundings through a bird's eye view.

Referring to FIG. 9, intersection scenarios 7 to 9, according to an embodiment, are exemplified based on three identifiable traffic lights including a left crosswalk traffic light 61, a right crosswalk traffic light 62, and a road-traveling traffic light 63, and an object movement pattern.

In the intersection scenario 7, "stop-on of left crosswalk traffic light 61", "stop-on of right crosswalk traffic light 62", "stop-on of road-traveling traffic light 63", and "stop-on of road-traveling traffic light of top-side traffic light" are recognized. Road-traveling crosswalk traffic light of the subject vehicle 100 is thus estimated as being in "crossing-on of road-traveling crosswalk traffic light".

Furthermore, the movement pattern of the object 70 is identified as moving across the intersection from the "left road" to the "right road".

Accordingly, it is recognized that a pedestrian may not be crossing the right crosswalk in the direction in which the subject vehicle 100 is about to turn right, but the movement pattern of the object 70 is confirmed to be from the "left road" to the "right road". The intersection situation determination engine 29 may thus output the "no right turn guidance" to the HMI 31.

In the intersection scenario 8, "stop-on of left crosswalk traffic light 61", "stop-on of right crosswalk traffic light 62", "stop-on of road-traveling traffic light 63", and "stop-on of road-traveling traffic light of top-side traffic light" are recognized. Road-traveling crosswalk traffic light of the subject vehicle 100 is thus estimated as being in "crossing-on of road-traveling crosswalk traffic light".

Furthermore, the movement pattern of the object 70 is identified as moving across the intersection from the "right road" to the "left road".

Accordingly, it is recognized that a pedestrian may not be crossing the right crosswalk in the direction in which the subject vehicle 100 is about to turn right, and the object 70 stops at the "left road". In this case, the intersection situation determination engine 29 does not output the "no right turn guidance".

In the intersection scenario 9, "stop-on of left crosswalk traffic light 61", "stop-on of right crosswalk traffic light 62", and "stop-on of road-traveling traffic light 63" are recognized. Road-traveling crosswalk traffic light of the subject vehicle 100 is thus estimated as being in "crossing-on of road-traveling crosswalk traffic light". Further, the top-side traffic light is estimated as being in "stop-on of road-traveling traffic light of the top-side traffic light".

Furthermore, the movement pattern of the object 70 is identified as moving across the intersection from the "left road" to the "right road".

Accordingly, it is recognized that the object 70 is moving across the intersection from the "left road" to the "right road" in the direction in which the subject vehicle 100 is about to turn right. The intersection situation determination unit 29 may thus output the "no right turn guidance".

In another embodiment, the intersection right turn hazard warning method implemented in the subject vehicle 100 may apply intersection scenarios 1-9 by applying intersection scenarios 1 to 6 using the procedure of S30→S60 as the first scenario for each intersection entry, and applying intersection scenarios 7-9, which are distinguished from intersection scenarios 1-6, using the procedure of S30→S40→S50→S60 as the second scenario for each intersection entry, or adding intersection scenarios 7-9 to intersection scenarios 1-6 as the third scenario for each intersection entry.

In an example, the third scenario for each intersection entry is confirmed by adding the information of the object 70 by the second vehicle exterior information sensor 15 to the first scenario for each intersection entry in the moving object identification engine 27, and an intersection scenario-specific warning tailored to the third scenario for each intersection entry upon a right turn of the subject vehicle 100 is output by the intersection situation determination engine 29 to the HMI 31 of the subject vehicle 100.

In this process, since the third scenario for each intersection entry corresponds to intersection scenario 1-9, the intersection scenario-specific warning is the same as the operation of each of the intersection scenarios 1-9 described above.

As described above, the intersection right turn hazard warning method using the intersection entry guidance system 1 of the vehicle 100 according to embodiments of the present disclosure reduces a collision hazard that may occur upon a right turn of the vehicle 100 at the intersection 50 by confirming the intersection information and vehicle right turn information from the vehicle information sensor 11, the traffic light-blinking pattern information of the left/right crosswalk traffic lights 61,62 and the road-traveling traffic light 63 from the first vehicle exterior information sensor 13, and the longitudinal movement pattern information of the object 70 at the intersection 50 from the second vehicle exterior information sensor 15, and outputting an intersection scenario-specific warning to the HMI 31 and/or the SVM 33 upon the right turn at the intersection with any one of the intersection scenarios 1 to 9 selected from the intersection situation classification table 21*a*.

While the present disclosure as described above has been illustrated with reference to the accompanying drawings, the present disclosure is not limited to the described embodiments, and it should be apparent to those of ordinary skill in the art that various modifications and variations can be made without departing from the spirit and scope of the present disclosure.

What is claimed is:

1. A method of providing a warning for a right turn hazard, the method comprising:

determining, by an intersection entry and right turn determination engine, an entry of a subject vehicle into a right turn at an intersection based on i) intersection information obtained from a vehicle information sensor and turning-on of a blinker of the subject vehicle;

recognizing, by a traffic light recognition engine, a verifiable traffic light-blinking pattern based on intersection traffic light information obtained from a first vehicle exterior information sensor;

identifying, by an intersection situation determination engine, a first scenario for each intersection entry based on the verifiable traffic light-blinking pattern and an intersection situation classification table;

identifying, by a moving object identification engine, a second scenario for each intersection entry from the intersection situation classification table based on information obtained by a second vehicle exterior information sensor as an object movement pattern at the intersection; and upon the entry of the subject vehicle into the right turn, outputting, by the intersection situation determination engine, an intersection scenario-specific warning according to the first scenario or the second scenario for each intersection entry to a human machine interface (HMI) of the subject vehicle, wherein:

the intersection information comprises i) a distance D1 from the subject vehicle to a center line of a left-side forward lane of left road lanes from the subject vehicle at the intersection and ii) a distance D2 from the subject vehicle to a center line of a right-side forward lane of right road lanes from the subject vehicle at the intersection, and a right turn lane where the subject vehicle is able to enter during a right turn is confirmed by a difference (D2−D1) between the distances D1 and D2.

2. The method according to claim 1, wherein an estimated traffic light-blinking state of non-verifiable traffic light is estimated based on the verifiable traffic light-blinking pattern for verifiable traffic lights among intersection traffic lights.

3. The method according to claim 2, wherein the verifiable traffic light-blinking pattern and the estimated traffic light-blinking state includes at least one of an intersection-passage traffic light, an intersection-passage/left turn traffic light, an intersection-left turn traffic light, an intersection-stop traffic light, an intersection crosswalk-stop traffic light, or an intersection crosswalk-crossing traffic light.

4. The method according to claim 2, wherein the first scenario for each intersection entry comprises at least one of:

an intersection scenario 1 with "crossing-on" of a right crosswalk traffic light of the intersection traffic light information at "passage-on" of a road-traveling traffic light of the intersection traffic light information, an intersection scenario 2 with "crossing-on" of a right crosswalk traffic light at "passage and left turn on" of the road-traveling traffic light, an intersection scenario 3 with "stop-on" of the right crosswalk traffic light at "left turn on" of the road-traveling traffic light, an intersection scenario 4 with "crossing-on" of the right crosswalk traffic light at "left turn on" of the road-traveling traffic light, an intersection scenario 5 with "passage and left turn on" of a top-side road traffic light and "stop-on" of the right crosswalk traffic light at "stop-on" of the road-traveling traffic light, or an intersection scenario 6 with the "crossing-on" of a road-traveling crosswalk traffic light and "crossing-on" of the right crosswalk traffic light at the "stop-on" of the road-traveling traffic light.

5. The method according to claim 4, wherein the intersection situation determination engine outputs a "crosswalk pedestrian collision warning" as the intersection scenario-specific warning for each of the intersection scenarios 1, 2, 4, 6.

6. The method according to claim 5, wherein each of the intersection scenarios 1, 2, 4, 6 shows the intersection scenario-specific warning through a bird's eye view of a surround view monitor (SVM) of the subject vehicle.

7. The method according to claim 4, wherein the intersection situation determination engine outputs no intersection scenario-specific warning for the intersection scenario 3.

8. The method according to claim 4, wherein the intersection situation determination engine outputs a "front left turn vehicle collision warning" as the intersection scenario-specific warning for the intersection scenario 5.

9. The method according to claim 2, wherein the second scenario for each intersection entry comprises at least one of:

an intersection scenario 7 with "passage-on" of a left traffic light of the intersection traffic light information and "passage-on" of a right traffic light of the intersection traffic light information at "stop-on" of a road-traveling traffic light of the intersection traffic light information, an intersection scenario 8 with "passage and left turn on" of the right traffic light at "stop-on" of the road-traveling traffic light, or an intersection scenario 9 with "passage and left turn on" of the left traffic light at "stop-on" of the road-traveling traffic light.

10. The method according to claim 9, wherein the intersection situation determination engine outputs "no-right turn guidance" as the intersection scenario-specific warning for each of the intersection scenarios 7 and 8.

11. The method according to claim 9, wherein the intersection situation determination engine outputs no intersection scenario-specific warning for the intersection scenario 8.

12. The method according to claim 1, wherein:

the vehicle information sensor comprises a navigator, the first vehicle exterior information sensor comprises a front camera, and the second vehicle exterior information sensor comprises a front radar or a front lateral radar.

13. The method according to claim 1, wherein the object movement pattern is an object longitudinal movement on a left-side road of the subject vehicle or the object longitudinal movement on a right-side road of the subject vehicle, wherein the object longitudinal movement is subject to an object longitudinal movement range, wherein the object longitudinal movement range comprises a minimum object longitudinal movement range, which is a sum (D1+α1) of the distance D1 and a width α1 of the left-side road of the subject vehicle, and a maximum object longitudinal movement range, which is a sum (D2+α2) of the distance D2 and a width α2 of the right-side road of the subject vehicle.

14. A method of providing warning for a right turn hazard, the method comprising:

determining, by in an intersection entry and right turn determination engine, an entry of a subject vehicle into a right turn at an intersection based on intersection information obtained from a vehicle information sensor and turning-on of a blinker of the subject vehicle;

recognizing, by in a traffic light recognition engine, a verifiable traffic light-blinking pattern from intersection traffic light information by a first vehicle exterior information sensor;

identifying, by an intersection situation determination engine, a first scenario for each intersection entry from the verifiable traffic light-blinking pattern and an intersection situation classification table; and upon the entry of the subject vehicle into the right turn, outputting, by the intersection situation determination engine, an intersection scenario-specific warning according to the first scenario or a second scenario for each intersection entry to a human machine interface (HMI) of the subject vehicle, wherein:

the intersection information comprises i) a distance D1 from the subject vehicle to a center line of a left-side forward lane of left road lanes from the subject vehicle at the intersection and ii) a distance D2 from the subject vehicle to a center line of a right-side forward lane of right road lanes from the subject vehicle at the intersection, and a right turn lane where the subject vehicle is able to enter during a right turn is confirmed by a difference (D2-D1) between the distances D1 and D2.

15. A vehicle intersection entry guidance system, comprising:

a vehicle sensor configured to detect at least one of intersection information, right turn information, a traffic light-blinking pattern determined from at least one of a left crosswalk traffic light, a right crosswalk traffic light, and a road-traveling traffic light at an intersection, or an object longitudinal movement pattern of an object passing through the intersection;

an intersection controller configured to, upon a right turn of a subject vehicle at the intersection, generate a first scenario for each intersection entry according to the traffic light-blinking pattern and a second scenario for each intersection entry according to a combination of the traffic light-blinking pattern and the object longitudinal movement pattern, and output an intersection scenario-specific warning according to the first scenario and the second scenario; and a human machine interface (HMI) configured to generate the intersection scenario-specific warning, wherein:

the intersection information comprises i) a distance D1 from the subject vehicle to a center line of a left-side forward lane of left road lanes from the subject vehicle at the intersection and ii) a distance D2 from the subject vehicle to a center line of a right-side forward lane of right road lanes from the subject vehicle at the intersection, and a right turn lane where the subject vehicle is able to enter during a right turn is confirmed by a difference (D2-D1) between the distances D1 and D2.

16. The vehicle intersection entry guidance system according to claim 15, wherein the vehicle sensor comprises a navigator for the intersection information, a blinker for the right turn information, a front camera for the traffic light-blinking pattern, and a front radar or a front lateral radar for the object longitudinal movement pattern.

17. The vehicle intersection entry guidance system according to claim 15, wherein the intersection controller comprises:

an intersection entry and right turn determination engine configured to check the intersection information and the right turn information and calculate the distance D1 to the center line of the left-side forward lane of left road lanes from the subject vehicle at the intersection and the distance D2 to the center line of a right-side forward lane of right road lanes from the subject vehicle at the intersection;

a traffic light recognition engine configured to estimate a traffic light-blinking status for remaining traffic lights at the intersection depending on the traffic light-blinking pattern;

a moving object identification engine configured to identify the object longitudinal movement pattern as being a minimum object longitudinal movement range, which is a sum $(D1+\alpha1)$ of the distance D1 and a width $\alpha1$ of a left-side road of the subject vehicle, and a maximum object longitudinal movement range, which is a sum $(D2+\alpha2)$ of the distance D2 and a width $\alpha2$ of a right-side road of the subject vehicle; and an intersection situation determination engine configured to classify the first scenario into scenarios 1 to 6 and the second scenario into scenarios 7 to 9 and output the intersection scenario-specific warning.

18. The vehicle intersection entry guidance system according to claim 17, wherein the intersection controller comprises an intersection classification table generation engine configured to build an intersection situation classification table having a combination of traffic light-blinking patterns and object longitudinal movement patterns for matching the scenarios 1 to 6 and the scenarios 7 to 9.

19. The vehicle intersection entry guidance system according to claim 15, wherein the intersection controller is configured to display the intersection scenario-specific warning as a bird's eye view of a surround view monitor (SVM).

\* \* \* \* \*